(12) United States Patent
Kiyota et al.

(10) Patent No.: US 11,987,960 B2
(45) Date of Patent: May 21, 2024

(54) WORK MACHINE, INFORMATION MANAGEMENT SYSTEM, INFORMATION TERMINAL, AND PROGRAM

(71) Applicant: SUMITOMO HEAVY INDUSTRIES, LTD., Tokyo (JP)

(72) Inventors: Yoshihisa Kiyota, Yokosuka (JP); Masahito Indoh, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 85 days.

(21) Appl. No.: 17/522,914

(22) Filed: Nov. 10, 2021

(65) Prior Publication Data

US 2022/0064911 A1  Mar. 3, 2022

Related U.S. Application Data

(63) Continuation of application No. PCT/JP2020/014008, filed on Mar. 27, 2020.

(51) Int. Cl.
| | | |
|---|---|---|
| *E02F 9/26* | (2006.01) | |
| *B60R 1/00* | (2022.01) | |
| *H04N 7/18* | (2006.01) | |
| *H04N 23/80* | (2023.01) | |

(Continued)

(52) U.S. Cl.
CPC ............... *E02F 9/261* (2013.01); *B60R 1/00* (2013.01); *H04N 7/181* (2013.01); *H04N 7/188* (2013.01); *H04N 23/80* (2023.01); *H04N 23/90* (2023.01); *B60R 2300/302* (2013.01); *B60R 2300/50* (2013.01); *E02F 3/32* (2013.01)

(58) Field of Classification Search
CPC ...... B60Y 2200/412; E02F 9/261; E02F 3/32; B60R 1/00; B60R 2300/302; B60R 2300/50; H04N 7/181; H04N 7/188; H04N 23/80; H04N 23/90
See application file for complete search history.

(56) References Cited

U.S. PATENT DOCUMENTS

| | | | |
|---|---|---|---|
| 9,476,964 B2 | 10/2016 | Stroila et al. | |
| 10,324,461 B2* | 6/2019 | Ogura | ................. A01B 69/008 |
| 10,889,958 B2* | 1/2021 | Oblak | ................. G06V 10/235 |

(Continued)

FOREIGN PATENT DOCUMENTS

| | | | |
|---|---|---|---|
| JP | 2016-058767 A | 4/2016 | |
| JP | 2019-015174 A | 1/2019 | |

(Continued)

OTHER PUBLICATIONS

European Search Report of EP 20 92 7716 dated Feb. 7, 2023.
International Search Report of PCT/JP2020/014008 (parent of the present application), dated Jun. 2, 2020.

*Primary Examiner* — Boubacar Abdou Tchoussou
(74) *Attorney, Agent, or Firm* — WTA Patents (57) ABSTRACT

There is provided a work machine including a traveling body, a rotating platform mounted on the traveling body, an attachment mounted on the rotating platform, and including a work element, an imaging unit mounted on the rotating platform, and configured to capture a peripheral image, and an imaging controller configured to cause the imaging unit to capture the image, when an imaging range of the imaging unit includes a predetermined subject region designated in advance.

12 Claims, 9 Drawing Sheets

(51) Int. Cl.
*H04N 23/90* (2023.01)
*E02F 3/32* (2006.01)

(56) References Cited

U.S. PATENT DOCUMENTS

| | | | |
|---|---|---|---|
| 11,195,351 B2* | 12/2021 | Kawamoto | E02F 9/267 |
| 11,459,735 B2* | 10/2022 | Takahama | H04N 13/122 |
| 11,568,593 B2* | 1/2023 | Cheng | E02F 9/205 |
| 2017/0248946 A1* | 8/2017 | Ogura | G05D 1/0038 |
| 2020/0058177 A1* | 2/2020 | Kawamoto | G01C 7/02 |
| 2020/0242829 A1* | 7/2020 | Cheng | E02F 9/262 |
| 2020/0399861 A1* | 12/2020 | Ito | E02F 9/26 |
| 2020/0399863 A1 | 12/2020 | Aizawa et al. | |
| 2022/0349154 A1* | 11/2022 | Fukuda | G01S 17/931 |

FOREIGN PATENT DOCUMENTS

| | | |
|---|---|---|
| JP | 2020-020156 A | 2/2020 |
| WO | WO 2019/172424 A1 | 9/2019 |

\* cited by examiner

WORK MACHINE, INFORMATION MANAGEMENT SYSTEM, INFORMATION TERMINAL, AND PROGRAM

CROSS-REFERENCE TO RELATED APPLICATION

This application is a bypass continuation of International PCT Application No. PCT/JP2020/014008, filed on Mar. 27, 2020, which is incorporated by reference herein in its entirety.

BACKGROUND

Technical Field

Certain embodiments of the present invention relate to a work machine, an information management system, an information terminal, and a program.

Description of Related Art

In the related art, for example, a work machine such as an excavator on which a camera is mounted to image surroundings is known (for example, refer to the related art).

SUMMARY

According to an aspect of the present invention, there is provided a work machine including a traveling body, a rotating platform mounted on the traveling body, an attachment mounted on the rotating platform, and including a work element, an imaging unit mounted on the rotating platform, and capturing an image of a periphery of the work machine, and an imaging controller configured to cause the imaging unit to capture the image, when an imaging range of the imaging unit includes a predetermined subject region designated in advance.

According to another aspect of the present invention, there is provided an information management system including a plurality of the work machines.

The plurality of work machine respectively include communication devices configured to transmit and receive information to and from each other, and share an imaging condition for capturing the image and the captured image by causing the communication devices to transmit and receive the imaging condition for capturing the image and the captured image to and from each other.

According to further another aspect of the present invention, there is provided an information management system including the work machine, and an information management device configured to transmit and receive information to and from the work machine.

The information management device receives a plurality of images captured by the work machine, and aligns the plurality of images in a time series manner.

According to still another aspect of the present invention, there is provided an information terminal configured to transmit and receive information to and from the work machine.

The information terminal causes a display unit to display a plurality of images captured by the work machine in a list display manner or in a sequential manner.

According to yet another aspect of the present invention, there is provided a computer readable medium storing a program that causes a computer of an information terminal configured to transmit and receive information to and from the work machine to function as a display controller that causes a display unit to display a plurality of images captured by the work machine in a list display manner or in a sequential manner.

DETAILED DESCRIPTION

It is desirable to improve work efficiency of a work site.

Certain embodiments of the present invention aim to improve efficiency of a work site by utilizing an imaging device provided in a work machine.

According to the embodiment of the present invention, efficiency of a work site can be improved by utilizing an imaging device provided in a work machine.

Hereinafter, an embodiment according to the present invention will be described in detail with reference to the drawings.

Configuration of Excavator

First, a configuration of an excavator 100 according to the present embodiment will be described. The excavator 100 is an example of a work machine according to the embodiment of the present invention, and is configured to include a work machine image acquisition device according to the present invention so that a work progress can be recorded by suitably acquiring an image of a work object.

Figure 1:
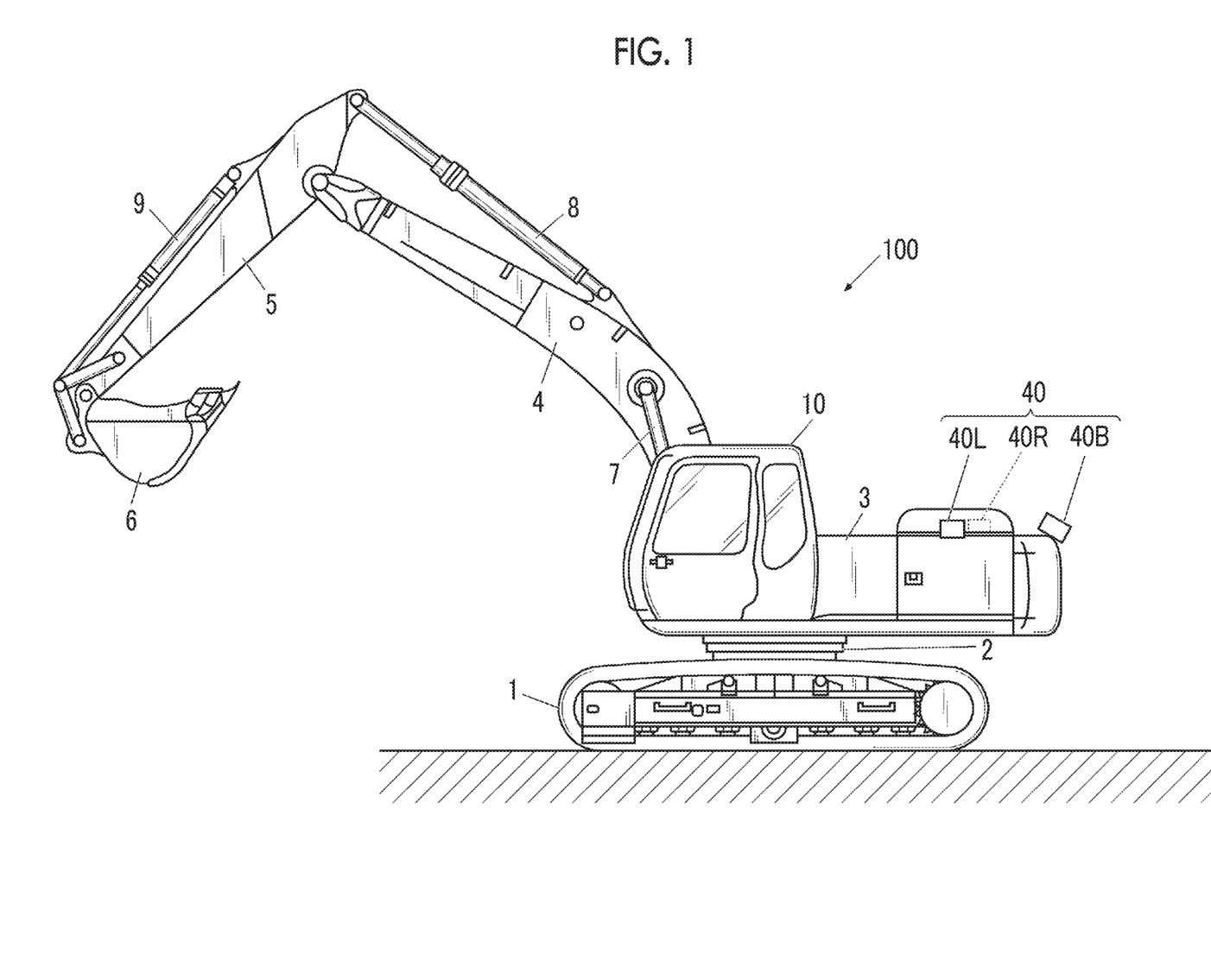
FIG. 1 is a side view of an excavator to an embodiment of the present invention.

FIG. 1 is a side view of the excavator 100 according to the present embodiment.

As illustrated in the drawing, the excavator 100 includes a lower traveling body 1, a rotating platform 3 mounted on the lower traveling body 1 to be capable of turning via a turning mechanism 2, a boom 4, an arm 5, and a bucket 6 which serve as attachments, and a cabin 10 on which the operator rides. The attachments are not limited thereto as long as a work element (for example, the bucket, a crusher, or a crane apparatus) is provided. For example, the lower traveling body 1 include a pair of right and left crawlers.

Each of the crawlers is hydraulically driven by a traveling hydraulic motor (not illustrated) so that the excavator 100 travels.

The rotating platform 3 is driven by a turning hydraulic motor or an electric motor (both are not illustrated) to turn with respect to the lower traveling body 1.

The boom 4 is pivotally attached to a front center of the rotating platform 3 to be capable of derricking, the arm 5 is pivotally attached to a tip of the boom 4 to be vertically pivotable, and the bucket 6 is pivotally attached to a tip of the arm 5 to be vertically pivotable. The boom 4, the arm 5, and the bucket 6 are respectively and hydraulically driven by a boom cylinder 7, an arm cylinder 8, and a bucket cylinder 9.

The cabin 10 is a cockpit on which an operator rides, and is mounted on a front left side of the rotating platform 3, for example.

Figure 2:
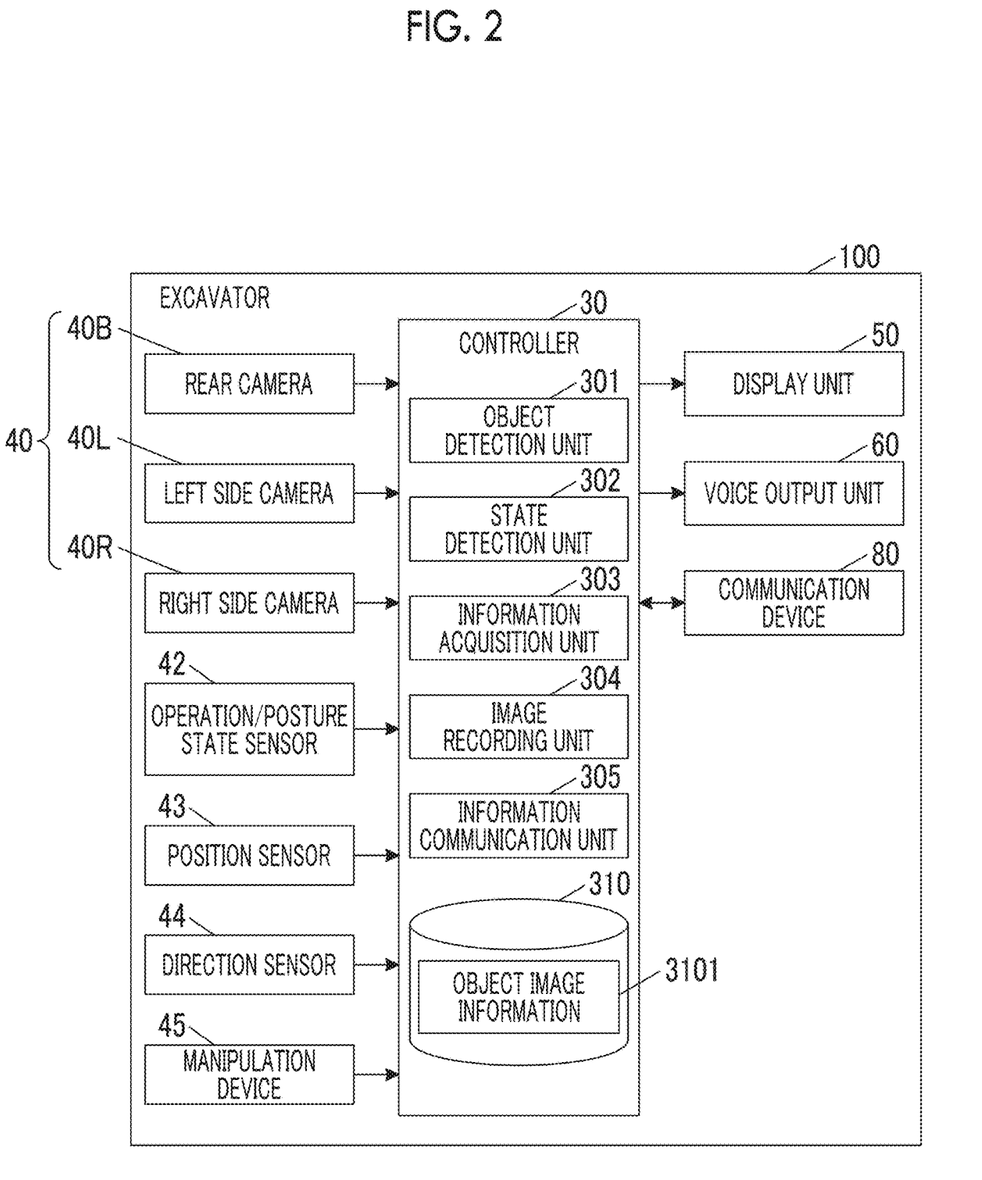
FIG. 2 is a block diagram illustrating a system configuration of the excavator in FIG. 1.

FIG. 2 is a block diagram illustrating a system configuration of the excavator 100.

As illustrated in the drawing, in addition to the above-described configuration, the excavator 100 includes a controller 30, an imaging device 40, an operation/posture state sensor 42, a position sensor 43, a direction sensor 44, a manipulation device 45, a display unit 50, a voice output unit 60, and a communication device 80. The image acquisition device according to the embodiment of the present invention includes the controller 30, the imaging device 40, the operation/posture state sensor 42, the position sensor 43, the direction sensor 44, and the communication device 80.

The imaging device 40 is attached to an upper portion of the rotating platform 3, images a periphery of the excavator 100, and outputs an image thereof to the controller 30. The imaging device 40 includes a rear camera 40B, a left side camera 40L, and a right side camera 40R.

The rear camera 40B is attached to a rear end upper portion of the rotating platform 3, and images a rear side of the rotating platform 3.

The left side camera 40L is attached to a left upper end portion of the rotating platform 3, and images a left side of the rotating platform 3.

The right side camera 40R is attached to a right end upper portion of the rotating platform 3, and images a right side of the rotating platform 3.

Each of the rear camera 40B, the left side camera 40L, and the right side camera 40R is attached in an upper portion of the rotating platform 3 so that an optical axis faces obliquely downward, and has an imaging range (angle of view) in a vertical direction including an area from a ground surface near the excavator 100 to a distant place of the excavator 100.

The rear camera 40B, the left side camera 40L, and the right side camera 40R may be attached to an upper surface of the rotating platform 3. The cameras 40B, 40L, and 40R may be attached so that a portion of the rotating platform 3 is imaged and the optical axis faces obliquely downward in a state where the cameras 40B, 40L, and 40R do not protrude from a side surface end portion of the rotating platform 3.

An object to be imaged and a portion of the rotating platform 3 are simultaneously acquired as images. Accordingly, captured images can be intuitively determined as the images acquired by using the cameras provided in the excavator 100. In addition, a sense of distance between the object to be imaged and the excavator 100 can be intuitively understood.

The operation/posture state sensor 42 is a sensor that detects an operation state or a posture state of the excavator 100, and outputs a detection result to the controller 30. The operation/posture state sensor 42 includes a boom angle sensor, an arm angle sensor, a bucket angle sensor, a triaxial inertial sensor (IMU: Inertial Measurement Unit), a turning angle sensor, and an acceleration sensor.

The sensors may be configured to include a cylinder stroke sensor of the boom and a sensor that acquires rotation information of a rotary encoder, or may be replaced by an acceleration (including a speed or a position) acquired by the IMU. The arm angle sensor detects a pivot angle (hereinafter, referred to as an "arm angle") of the arm 5 with reference to the boom 4.

The bucket angle sensor detects a pivot angle (hereinafter, referred to as a "bucket angle") of the bucket 6 with reference to the arm 5.

The IMU is attached to each of the boom 4 and the arm 5, and detects the acceleration of the boom 4 and the arm 5 along predetermined three axes and an angular acceleration of the boom 4 and the arm 5 around the predetermined three axes.

The turning angle sensor detects a turning angle with reference to a predetermined angular direction of the rotating platform 3. However, the present invention is not limited thereto, and the turning angle may be detected, based on a GPS or the IMU sensor provided in the rotating platform 3.

The acceleration sensor is attached to a position away from a turning axis of the rotating platform 3, and detects the acceleration at the attached position of the rotating platform 3. In this manner, based on a detection result of the acceleration sensor, it is possible to determine whether the rotating platform 3 is turned or whether the lower traveling body 1 travels.

The position sensor 43 is a sensor that acquires information on a position (current position) of the excavator 100, and is a global positioning system (GPS) receiver in the present embodiment. The position sensor 43 receives a GPS signal including the information on the position of the excavator 100 from a GPS satellite, and outputs the acquired information on the position of the excavator 100 to the controller 30. The position sensor 43 may not be the GPS receiver as long as the information on the position of the excavator 100 can be acquired, and for example, may adopt a satellite positioning system other than the GPS. The position sensor 43 may be provided in the lower traveling body 1 or may be provided in the rotating platform 3.

The direction sensor 44 is a sensor that acquires information on a facing direction (direction) of the excavator 100, and is a geomagnetic sensor, for example. The direction sensor 44 acquires information on the direction of the excavator 100, and outputs the information to the controller 30. As long as the information on the direction of the excavator 100 can be acquired, a sensor type of the direction sensor 44 is not particularly limited. For example, two of the GPS may be provided to acquire direction information from position information thereof.

The manipulation device 45 is provided near the cockpit of the cabin 10 for the operator to operate each operation element (the lower traveling body 1, the rotating platform 3, the boom 4, the arm 5, and the bucket 6). In other words, the manipulation device 45 operates each hydraulic actuator that drives each operation element. For example, the manipulation device 45 includes a lever, a pedal, and various buttons, and outputs an operation signal corresponding to operation contents thereof to the controller 30.

In addition, the manipulation device 45 includes various setting units configured to operate the imaging device 40, the operation/posture state sensor 42, the position sensor 43, the direction sensor 44, the display unit 50, the voice output unit 60, and the communication device 80, and outputs an operation command for each of the units to the controller 30.

The display unit 50 is provided in the periphery of the cockpit inside the cabin 10, and displays various image information to be notified to the operator under the control of the controller 30. For example, the display unit 50 is a liquid crystal display or an organic electroluminescence (EL) display, and may be a touch panel type that also functions as at least a portion of the manipulation device 45.

The voice output unit 60 is provided in the periphery of the cockpit inside the cabin 10, and outputs various voice information to be notified to the operator under the control of the controller 30. For example, the voice output unit 60 is a speaker or a buzzer.

The communication device 80 transmit and receive various information to and from a remote external device or another excavator 100 through a predetermined communication network (for example, a mobile phone network whose end is a base station or the Internet network), based on predetermined wireless communication standards.

The controller 30 is a control device that performs driving control of the excavator 100 by controlling an operation of each unit of the excavator 100. The controller 30 is mounted on the cabin 10. A function of the controller 30 may be realized by any desired hardware, software, or a combination thereof, and the controller 30 is configured to mainly include a microcomputer including a CPU, a RAM, a ROM, and an I/O, for example.

In addition, as functional units that fulfill various functions, the controller 30 includes an object detection unit 301, a state detection unit 302, an information acquisition unit 303, an image recording unit 304, and an information communication unit 305. In addition, the controller 30 includes a storage unit 310 serving as a storage region defined in an internal memory such as an electrically erasable programmable read-only memory (EEPROM).

The object detection unit 301 detects a detection object in the periphery of the excavator 100, based on the image captured by the imaging device 40. Specifically, the object detection unit 301 recognizes the detection object inside the captured image by applying various known image processing methods or a classifier on a machine learning base, and identifies an actual position or a dimension of the recognized detection object. The detection object is a work object of the excavator 100. However, the detection object may include a person such as a worker, another work machine, a vehicle, or a temporarily placed construction material.

The state detection unit 302 acquires information relating to various states (operation state and control state) of the excavator 100 from various sensors mounted on the excavator 100 (for example, the imaging device 40, the operation/posture state sensor 42, the position sensor 43, the direction sensor 44, and the manipulation device 45), various actuators (for example, an electromagnetic valve that performs hydraulic control), and various control devices (for example, other functional units of the controller 30). For example, the state detection unit 302 can acquire the position and the direction of the excavator 100 by the position sensor 43 and the direction sensor 44, and can detect an excavation operation of the excavator 100 by detecting an operation or a load of the bucket 6.

The information acquisition unit 303 acquires work-related information relating to the work performed by the excavator 100, and stores the work-related information in the storage unit 310. The work-related information includes work information, date and time information, weather information, position information, machine body information, and operator information.

The work information can include information such as a work (construction) name, a work place, a work content, an owner of the excavator, a subcontractor of the work, an intermediate person, and an end user relating to the work. For example, the information acquisition unit 303 acquires work information, based on an input operation of the operator through the manipulation device 45.

The date and time information includes the date, the day of the week, and the time of day. The information acquisition unit 303 acquires date and time information by using a timekeeper (for example, a real time clock (RTC)) inside the controller 30.

The weather information is weather information in a place at the date and time during the work of the excavator 100, and includes information relating to a weather classification such as sunny, cloudy, rainy, and snowy. The information acquisition unit 303 acquires desired weather information from a server or website relating to the weather through the communication device 80. Alternatively, the information acquisition unit 303 may include an illuminance sensor or a raindrop detection sensor, and may acquire the weather information, based on illuminance or the presence or absence of the raindrop which is output by the sensors.

The position information is information on a position of the excavator 100, and includes information relating to a longitude and a latitude. In addition, the position information may include more advanced information, or may be geocode information such as the Geohash. The information acquisition unit 303 acquires position information by using the position sensor 43.

The machine body information is identification information of the excavator 100 for identifying the excavator 100, and is a prescribed machine number or an ID of the excavator, for example. For example, the information acquisition unit 303 acquires machine body information by reading a machine number recorded in advance in the storage unit 310.

The operator information is identification information of the operator for identifying the operator who operates the excavator 100, and is a prescribed operator ID. For example, the information acquisition unit 303 acquires operator information, based on an input operation of the operator through the manipulation device 45.

The work-related information (work information, date and time information, weather information, position information, machine body information, and operator information) is input by the input operation through the manipulation device 45 (information may directly be input or may be selected from information set in advance). However, the information may automatically be acquired by using a communication technology or an information processing technology.

The work-related information may be stored in association with each other.

The image recording unit 304 records the image of the detection object (work object) which is acquired by the imaging device 40 in the storage unit 310 as object image information 3101. In this case, the image recording unit 304 may embed work-related information or a figure indicating a distance to the work object or a dimension of the work object in the image to be recorded.

When a prescribed notification condition is satisfied, the information communication unit 305 controls the communication device 80 to transmit and receive predetermined information to and from an external device or another excavator 100.

Operation of Excavator

Subsequently, an operation of the excavator 100 when an image capturing process is performed to capture an image and record a work progress will be described. When the work progress can be acquired by utilizing the imaging device 40 provided in the excavator 100, it is not necessary to separately prepare an imaging device. In addition, a process of manually imaging the work progress can be omitted. Therefore, efficiency of a work site is improved.

Figure 3:
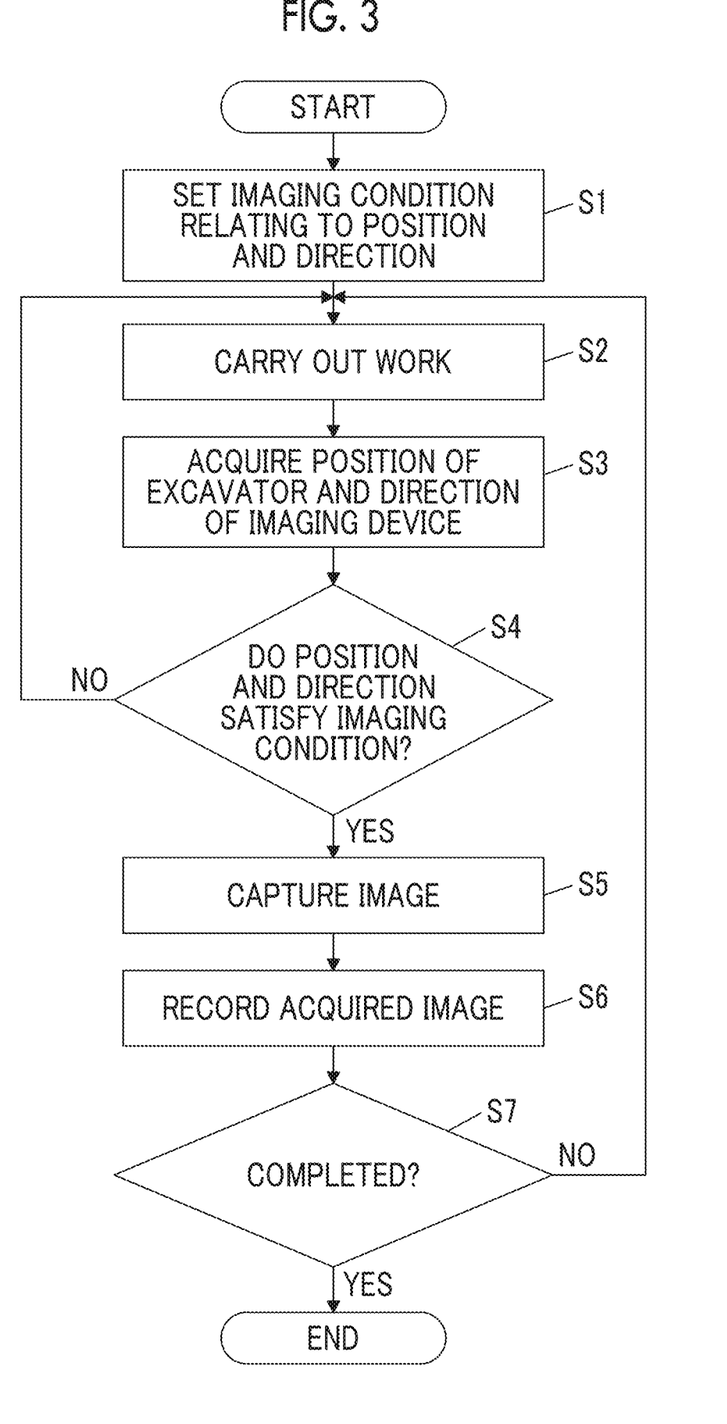
FIG. 3 is a flowchart illustrating a flow of an image capturing process.
Figure 4A:
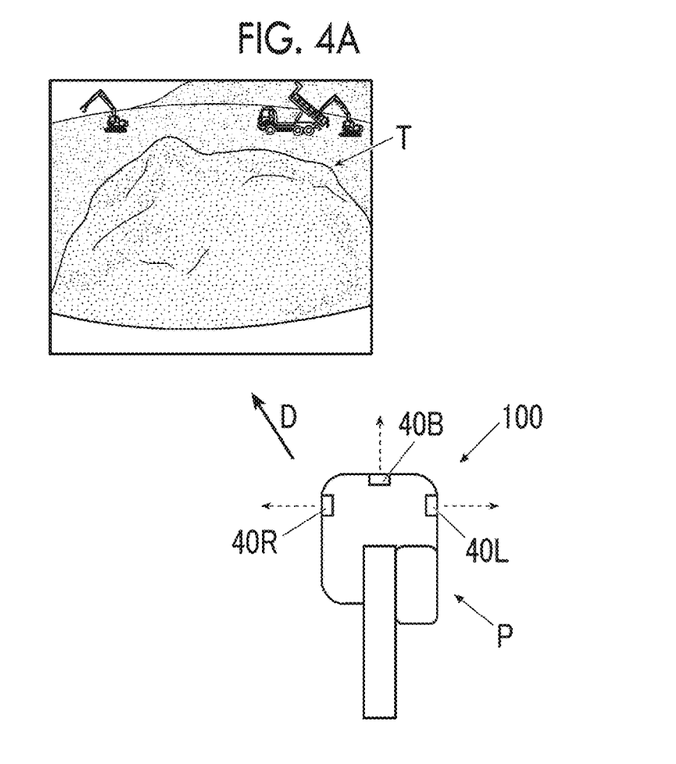
FIG. 4A is a view for describing an imaging condition in the image capturing process.
Figure 4B:
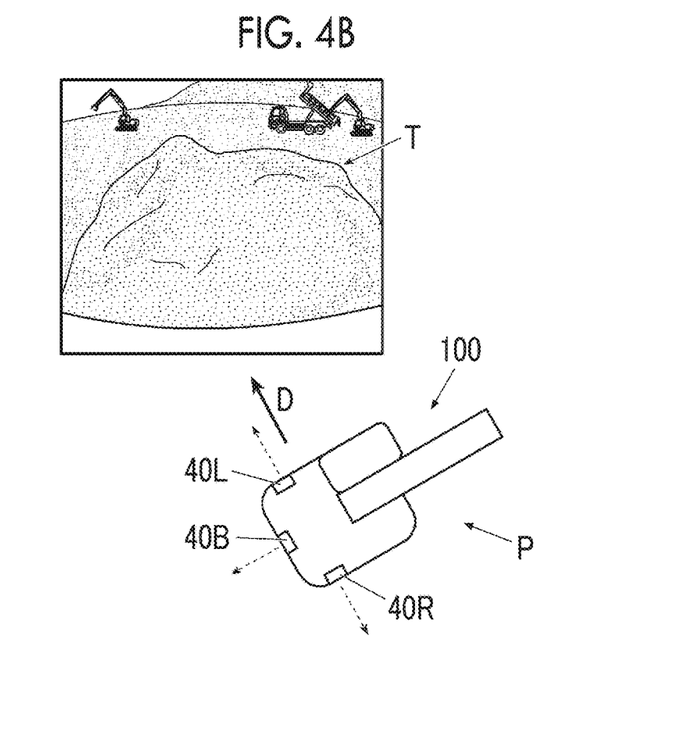
FIG. 4B is a view for describing an imaging condition in the image capturing process.
Figure 5:
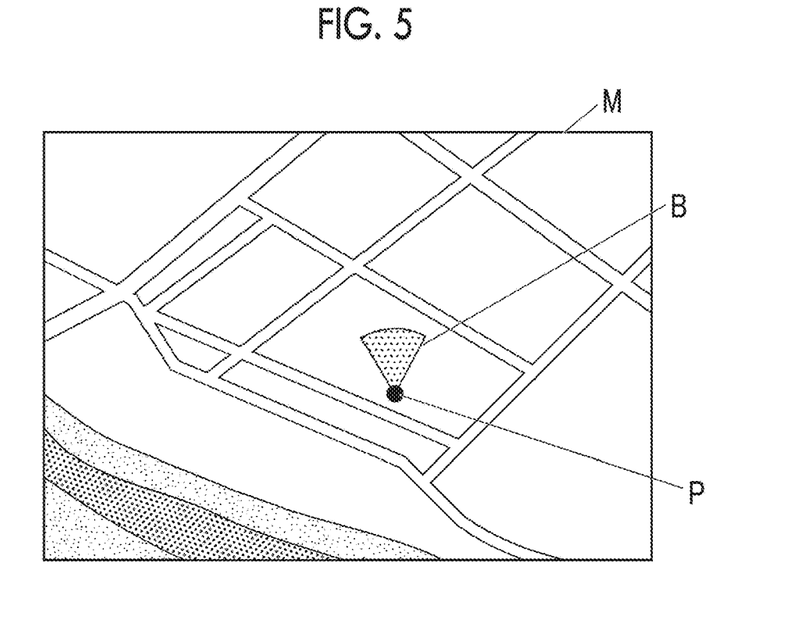
FIG. 5 is a view for describing an imaging condition in the image capturing process.
Figure 6A:
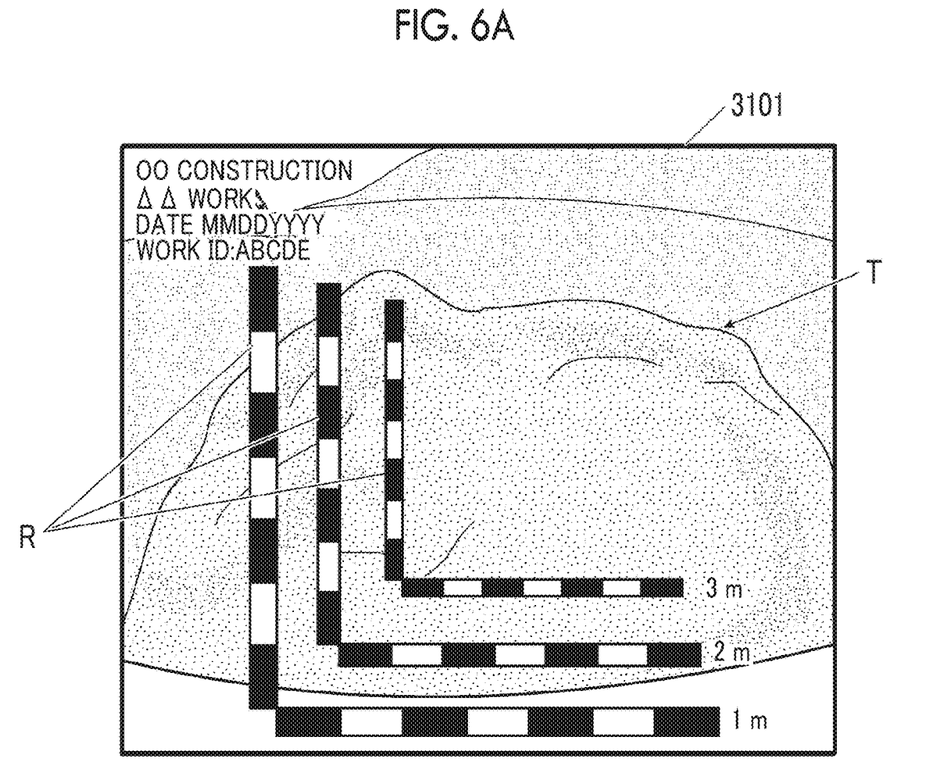
FIG. 6A is a view illustrating an example of an image captured in the image capturing process.
Figure 6B:
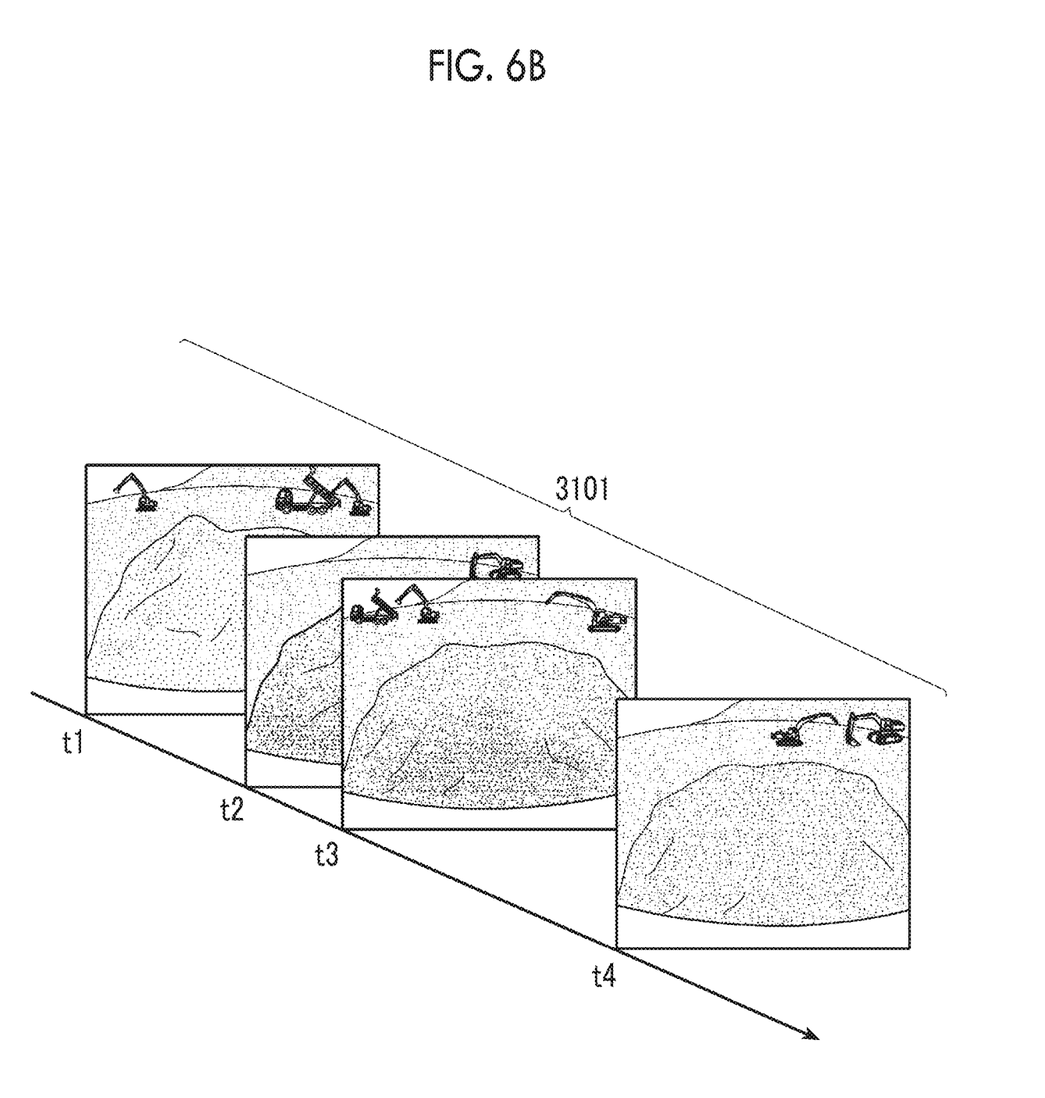
FIG. 6B is a view illustrating an example of an image captured in the image capturing process.

FIG. 3 is a flowchart illustrating a flow of the image capturing process. FIGS. 4A, 4B, and 5 are views for describing imaging conditions in the image capturing process. FIGS. 6A and 6B are views illustrating an example of the captured image.

The image capturing process is performed to cause the CPU to execute a program stored in an internal storage device by the controller 30.

When the image capturing process is performed, as illustrated in FIG. 3, as imaging conditions for capturing the image in advance, the controller 30 first sets conditions relating to the position of the excavator 100 and the direction of the imaging device 40 before carrying out the work (Step S1). Specifically, as illustrated in FIG. 4A, based on an operation of the operator, the controller 30 sets an imaging position P and an imaging direction D of the imaging device 40 which captures the image. The imaging position P is set, based on information on a longitude and a latitude (or additionally an altitude), and the imaging direction D is set, based on information on a direction angle (or additionally a derricking angle). The imaging position P and the imaging direction D may be a relative position and a relative direction with respect to a reference absolute position and a reference absolute direction. In addition, any desired range (for example, the position falls within a radius of 5 m, and the direction falls within a direction of 5 degrees) can be set for each of the imaging position P and the imaging direction D. The operator appropriately sets the imaging position P and the imaging direction D so that a work object T of the excavator 100 is included inside the image. The controller 30 records the imaging conditions including the set imaging position P and the set imaging direction D in the storage unit 310.

The operator can set the position and the direction on a predetermined map. In this case, the operator can designate a place where the operator wants to confirm the work progress while having an overhead view of the entire map. In addition, the place may be designated by a site supervisor or a manager of the work site. In this case, designation on the map can be made by an external unit (touch panel or management terminal) of the excavator 100, and the information can be transmitted to the excavator 100.

The imaging conditions set in Step S1 are not limited to those which include the imaging position P and the imaging direction D of the imaging device 40. Any desired imaging condition may be set as long as the image is captured by the imaging device 40 when the imaging range of the imaging device 40 includes a predetermined subject region designated in advance in the periphery of the excavator 100. When the imaging range of the imaging device 40 includes the subject region means when at least one of the position and the direction of the imaging device 40 is coincident with a predetermined position or a predetermined direction designated in advance (including when falling within a predetermined range). Under the imaging condition, the image of the desired subject region including the work object can be captured.

The imaging condition may be set in the same manner as when the imaging position P and the imaging direction D are set as described above. For example, as illustrated in FIG. 5, a desired subject region B may be set on a map M displayed on the display unit 50. In this case, the imaging position P of the imaging device 40 may be designated, or may not be designated. Although the subject region B having a fan shape is illustrated in an example in FIG. 5, a shape of the subject region B is not particularly limited. In addition, the subject region B may be designated by an external unit (touch panel or management terminal) of the excavator 100, and the information may be transmitted to the excavator 100.

In addition, the position of the excavator 100 and the direction of the imaging device 40 when the conditions are set in Step S1 are not particularly limited. For example, the imaging condition may be set in a state where the excavator 100 is located away from the imaging position P. However, after the image captured by the imaging device 40 is displayed on the display unit 50 and the operator actually confirms the work object T to be imaged through the display unit 50, it is preferable that the position of the excavator 100 and the direction of the imaging device 40 in that case are acquired by the position sensor 43 and the direction sensor 44 and are set as the imaging position P and the imaging direction D.

In addition, as the imaging conditions, conditions other than the imaging position P and the imaging direction D of the imaging device 40 may be added to the imaging position P and the imaging direction D.

For example, on a condition that a predetermined time elapses from when the image is previously captured, a time condition such that capturing the image of the same work object T (subject region) again may be added. Alternatively, on a condition that a predetermined operation of the excavator 100 (for example, a predetermined number of excavation operations) is detected from when the image is previously captured, an operation condition such as capturing the image of the same work object T (subject region) again may be added. In addition, the time condition and operation condition may be combined with each other.

Next, the controller 30 drives the excavator 100 to start the work (Step S2). In the present embodiment, the excavator 100 carries out excavation work for the work object T.

Next, the controller 30 acquires the position and the direction of the imaging device 40 in the excavator 100 during the work (Step S3).

Specifically, the state detection unit 302 of the controller 30 causes the position sensor 43 to acquire the position of the imaging device 40, and causes the direction sensor 44 to acquire the direction of the imaging device 40. The position of the imaging device 40 is each position of the rear camera 40B, the left side camera 40L and the right side camera 40R. The position of the position sensor 43 in excavator 100 is acquired by the position sensor 43 to acquire a position of each camera fixed to the excavator 100 (rotating platform 3) at a known position. In addition, the direction of the imaging device 40 is a direction of each of the rear camera 40B, the left side camera 40L, and the right side camera 40R. The direction of the excavator 100 (rotating platform 3) is acquired by the direction sensor 44 to acquire the direction of each camera fixed to the rotating platform 3 in a known direction.

Next, the controller 30 determines whether or not the position of the excavator 100 and the direction of the imaging device 40 which are acquired in Step S3 satisfy the imaging condition set in Step S1 (Step S4).

Specifically, the controller 30 determines whether or not the position and the direction of the imaging device 40 are coincident with the imaging position P and the imaging direction D which are the imaging conditions. That is, it is determined whether or not the position of any of the imaging devices 40 exists at the imaging position P and the direction of any of the imaging devices 40 (in the present embodiment, an optical axis of the camera which is illustrated by a broken line in FIG. 4) faces the imaging direction D. In a case where the range is set at the imaging position P and in the imaging direction D, when the position and the direction of the imaging device 40 fall within the range, it is determined that the position of any of the imaging devices 40 are coincident with the imaging position P and the imaging direction D.

Then, when it is determined that at least one of the acquired position and the acquired direction of the imaging device 40 does not satisfy the imaging conditions (Step S4; No), the process proceeds to Step S2 described above, and the controller 30 continues the work until the imaging conditions are satisfied.

When conditions other than the imaging position P and the imaging direction D are set as the imaging conditions in Step S1 described above, the conditions are determined in Step S4.

For example, when a condition of an elapsed time from the previous image capturing is set, the controller 30 counts the elapsed time from the previous image capturing by using the RTC, for example, and determines whether or not the elapsed time is a predetermined time. However, as a matter of course, the determination is not required when the image is first captured. Alternatively, when an operation condition is set so that the image is captured when a predetermined operation (for example, a predetermined number of excavation operations from the previous image capturing) of the excavator 100 is detected, the controller 30 determines whether or not the predetermined operation of the excavator 100 is detected by the operation/posture state sensor 42.

In addition, it is preferable that the imaging condition in Step S4 is determined (particularly, determining the imaging direction D) while the rotating platform 3 turns after the work is carried out by the attachment.

In addition, when a result is recorded after self-work, it is preferable to capture the image by using a camera on a side surface opposite to a turning direction of the rotating platform 3 after the excavation work. In this manner, the work object T after the work can reliably be imaged. However, a configuration is not limited thereto, when the attachment or the rotating platform 3 is provided with the imaging device that images the front side.

In addition, an imaging timing is preferably when the rotating platform 3 is stopped. Accordingly, the imaging timing may be incorporated into the imaging condition as the operation condition of the excavator 100. In addition, when the condition is set so that the lower traveling body 1 or the attachment is stopped, vibration caused by the operation is not generated in the rotating platform 3, and a clear image can be acquired.

When it is determined in Step S4 that the position and the direction of the imaging device 40 satisfy the imaging condition (Step S4; Yes), as illustrated in FIG. 4B, the controller 30 causes any camera (left side camera 40L in FIG. 4B) of the imaging device 40 which satisfies the imaging condition to capture the image (Step S5).

Then, the controller 30 causes the storage unit 310 to record the image acquired in Step S5 as the object image information 3101 (Step S6).

In this case, as illustrated in FIG. 6A, when necessary, the image recording unit 304 of the controller 30 embeds the work-related information relating to the work carried out by the excavator 100 in the image, and causes the storage unit 310 to record the image. In this case, for example, based on the operation of the operator, the image recording unit 304 of the controller 30 causes the information acquisition unit 303 to acquire the work-related information to be recorded together with the image, and causes the storage unit 310 to record the image in which the work-related information is embedded. In an example in FIG. 6A, as the work-related information, in addition to the work name, the work contents, the date, and the work (excavator) ID, a figure R indicating the distance to the work object T and the dimension of the work object T is embedded in the image. When the figure R is used, the controller 30 causes the object detection unit 301 to detect the work object T from the image, and acquires the distance to the work object T and the dimension of the work object T.

In this case, as illustrated in FIG. 6B, as the object image information 3101, the image recording unit 304 of the controller 30 causes the storage unit 310 to collectively record those in which the captured image of the work object T (still image) and the previously captured image of the work object T (still image) are aligned in a time series manner. Alternatively, the images (still images) may be aligned in the time series manner to generate a moving image, and the moving image may be recorded in the storage unit 310 as the object image information 3101.

In this manner, it is possible to acquire a series of images or moving images which indicate a progress (time change in the work object T) of the work.

Next, the controller 30 determines whether or not the work is completed by the excavator 100 (Step S7), and when the controller 30 determines that the work is not completed (Step S7; No), the process proceeds to Step S2 described above, and the controller 30 continues the work. In this manner, until it is determined that the work is completed, acquiring the position and the direction of the imaging device 40, determining whether or not the position and the direction satisfy the imaging conditions, capturing the image, and recording the image when the imaging conditions are satisfied are sequentially and repeatedly performed.

In addition, when it is determined that the work is completed, for example, when a power source such as an engine of the excavator 100 is stopped by the operator, and at least in a state where an actuator of the attachment is not moved even when the actuator is operated (Step S7; Yes), the controller 30 completes the image capturing process.

When an electric storage unit is provided, in a state where the actuator is not moved even when the actuator is operated, the above-described process can be performed by activating the imaging device 40 or the controller 30.

Technical Effects of Present Embodiment

As described above, according to the present embodiment, when the imaging range of the imaging device 40 includes the subject region B designated in advance in the periphery of the excavator 100, the imaging device 40 captures the image.

In this manner, the work progress can be acquired by utilizing the imaging device 40 provided in the excavator 100. Therefore, it is not necessary to separately prepare the imaging device. In addition, a process of manually imaging the work progress can be omitted. Therefore, efficiency of a work site can be improved.

In addition, a temporal imaging frequency can be specified by adding a time condition that the image is captured when a predetermined time elapses from the previous image capturing.

In this manner, for example, it is possible to reduce capacity of the recorded image by avoiding a situation in which the same place is frequently imaged due to the turning of the rotating platform 3.

In addition, the operation condition is added so that the image is captured when a predetermined operation of the excavator 100 is detected. In this manner, the image can be acquired in conjunction with not only the position or the posture of the excavator 100, but also the operation of the excavator 100.

In this manner, for example, the image can be captured for each excavation operation performed a predetermined number of times, or the image can be captured after the rotating platform 3 is reliably stopped.

In addition, the work-related information relating to the work can be acquired, and the work-related information can be embedded in the captured image. Accordingly, the amount of information in the image can be increased.

In addition, the moving image indicating the progress of the work (time change in the work object T) can be acquired by aligning a plurality of captured images in a time series manner.

Modification Example

Subsequently, a modification example of the above-described embodiment will be described.

This modification example is different from the above-described embodiment in that images captured by a plurality of excavators 100 are accumulated in a management server. The same reference numerals will be assigned to component the same as those in the above-described embodiment, and description thereof will be omitted.

Figure 7:
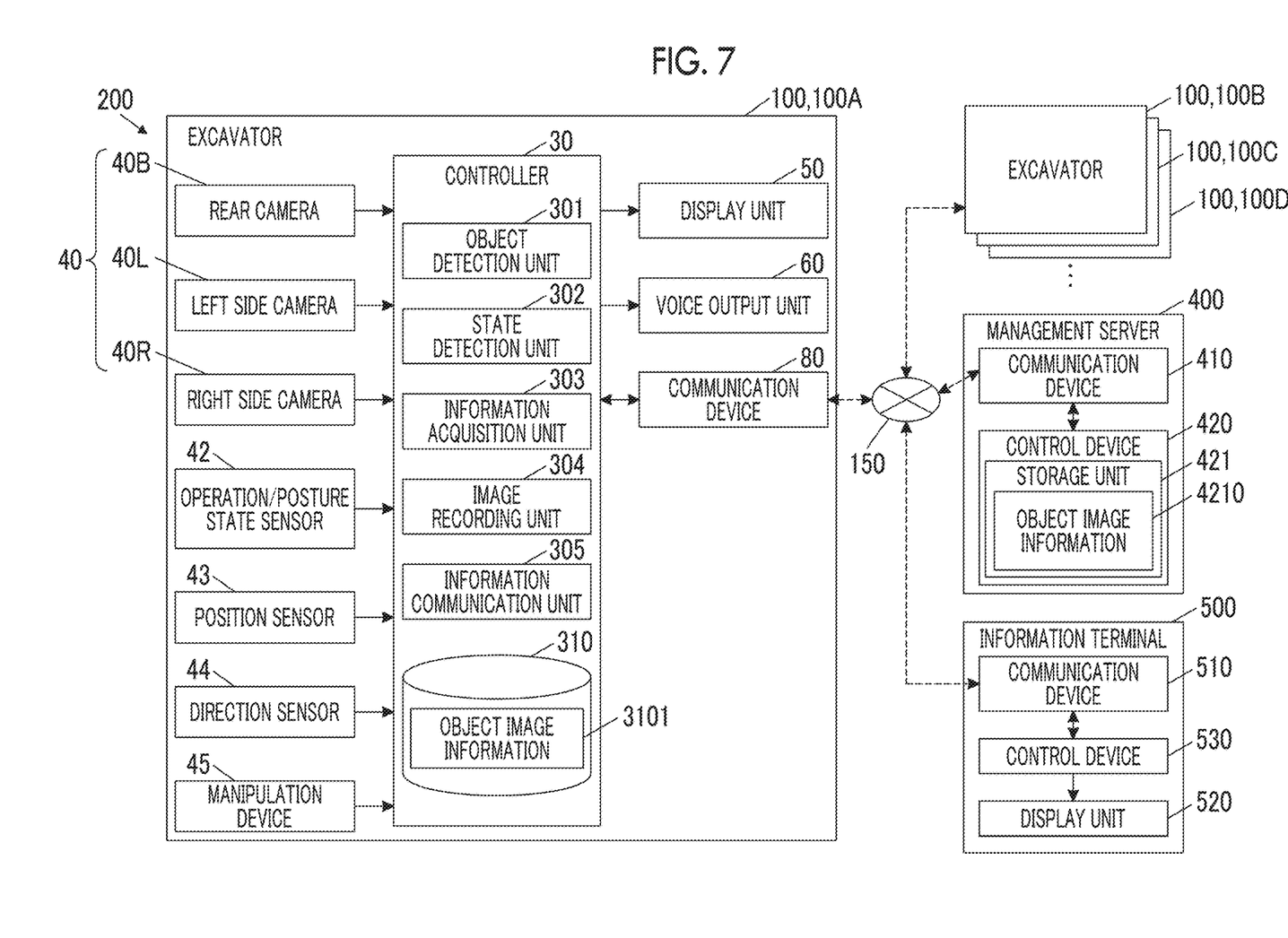
FIG. 7 is a block diagram illustrating a system configuration of an information management system according to a modification example of the embodiment of the present invention.

FIG. 7 is a block diagram illustrating a system configuration of an information management system 200 in this modification example.

As illustrated in drawing, the information management system 200 is configured to include a plurality of excavators 100 (100A, 100B, 100C, and 100D in this modification example) configured to be similar to each other, a management server 400, and an information terminal 500. In FIG. 7, a configuration of the excavator 100 (100B, 100C, and 100D) other than the excavator 100A is omitted in the illustration.

The plurality of excavators 100 can transmit and receive various information to each other through the communication network 150 by each of the communication devices 80 provided therein, and can also transmit and receive various information to and from each of the management server 400 and the information terminal 500 through the communication network 150.

The management server 400 is an example of an information management device according to the embodiment of the present invention, and for example, is a server device installed in a management center provided outside a work site where the plurality of excavators 100 carry out work. The management server 400 may be an in-house server operated by a business person who operates the information management system 200 or a related business person thereof, or may be a so-called cloud server.

Specifically, the management server 400 includes a communication device 410 and a control device 420.

The communication device 410 can transmit and receive various information to and from each of the plurality of excavators 100 through the communication network 150.

The control device 420 controls various operations in the management server 400. The control device 420 includes a storage unit 421 serving as a storage region defined in an internal memory such as EEPROM, and stores and manages various information in the storage unit 421. For example, as the object image information 4210, the storage unit 421 stores (accumulates) the image (object image information 3101) captured and transmitted by each of the excavators 100.

For example, the information terminal 500 is a mobile terminal such as a tablet or a smartphone possessed by a user. The user can access and read various work records inside the information management system 200 through the information terminal 500. The information terminal 500 may be a stationary computer terminal or a portable computer terminal.

Specifically, the information terminal 500 includes a communication device 510, a display unit 520, and a control device 530.

The communication device 510 can transmit and receive various information to and from each of the plurality of excavators 100 and the management server 400 through the communication network 150. For example, the display unit 520 is a liquid crystal display or an organic electroluminescence (EL) display, and may be a touch panel type that also serves as an operation unit. The control device 530 controls various operations in the information terminal 500.

FIGS. 8A to 8D are views for describing an operation of the excavator 100 in the information management system 200.

In the information management system 200, the plurality of excavators 100 share the imaging conditions the same as those in the above-described embodiment by direct communication (or indirect communication via the management server 400). Then, while each of the plurality of excavators 100 is operated in substantially the same manner as in the above-described embodiment, the image (object image information 3101) captured by each of the excavators 100 is transmitted to the management server 400. In this manner, all of the images are accumulated in the management server 400.

Figure 8A:
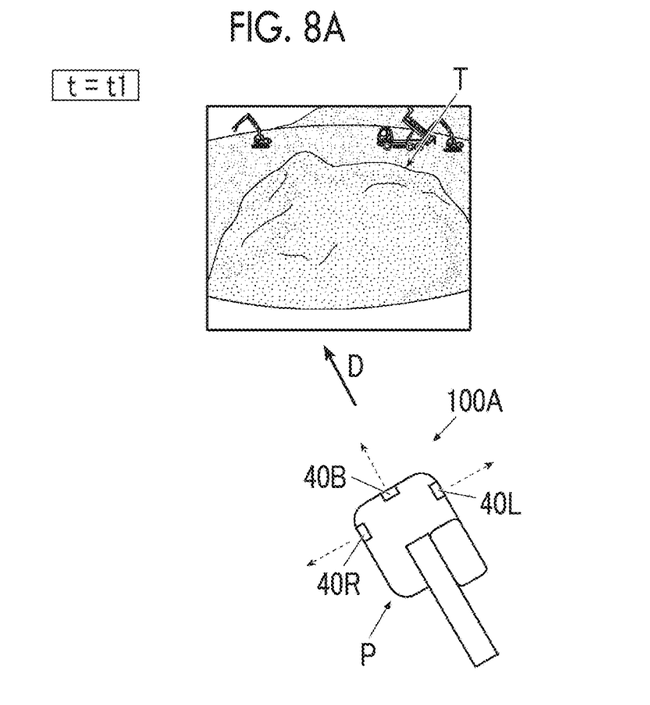
FIG. 8A is a view for describing an operation of the excavator in the information management system in FIG. 7.
Figure 8B:
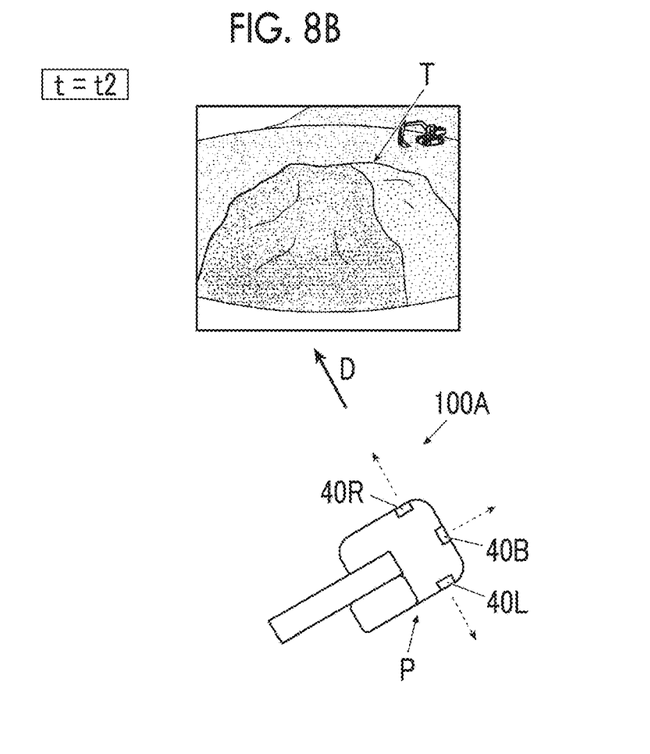
FIG. 8B is a view for describing an operation of the excavator in the information management system in FIG. 7.

For example, as illustrated in FIGS. 8A to 8D, the rear camera 40B images the work object T in a state where the ground is filled with earth before the excavator 100A carries out the work at time t1 (FIG. 8A). Thereafter, the right side camera 40R images the work object T in a state where the excavation is progressively carried out at time t2 (FIG. 8B). The captured images are sequentially transmitted from the excavator 100A to the management server 400 by the communication device 410.

Figure 8C:
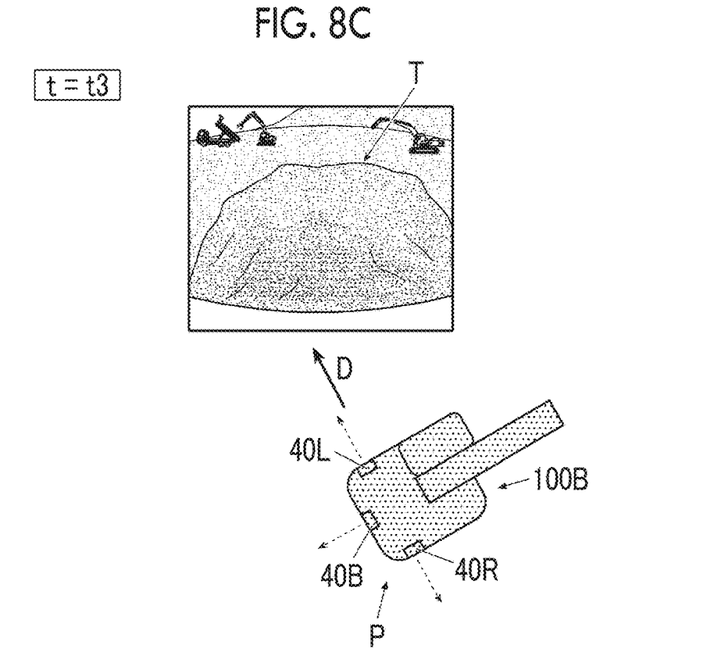
FIG. 8C is a view for describing an operation of the excavator in the information management system in FIG. 7.
Figure 8D:
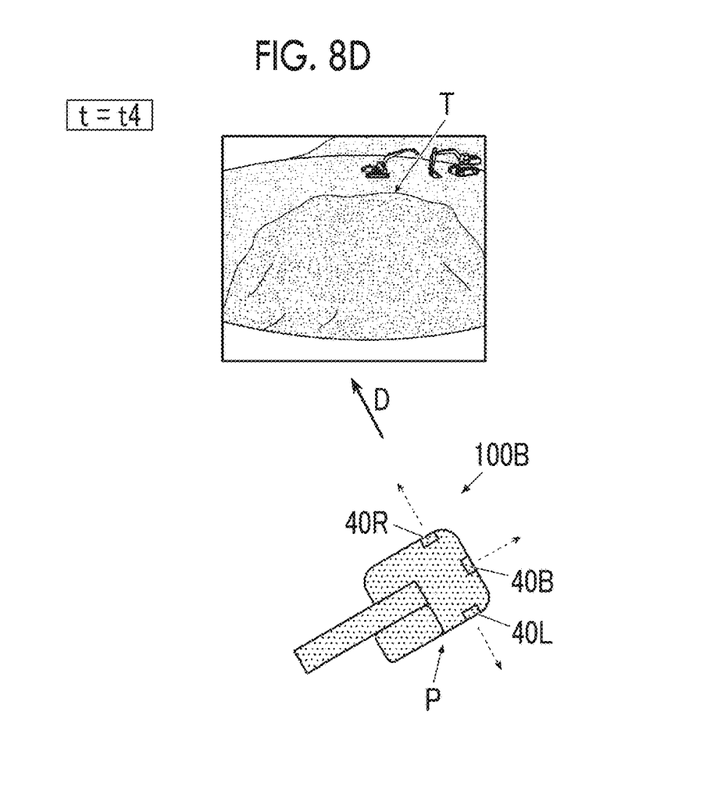
FIG. 8D is a view for describing an operation of the excavator in the information management system in FIG. 7.

Thereafter, the left side camera 40L images the work object T in a state where the other excavator 100B completes the excavation at time t3 (FIG. 8C). Thereafter, the right side camera 40R images the work object T in a state where the ground is flattened at time t4 (FIG. 8D). The images are also sequentially transmitted from the excavator 100B to the management server 400 by the communication device 410.

In this way, the images captured by the plurality of different excavators 100 are accumulated and managed in the management server 400. The plurality of accumulated images may be used as a series of images or moving images formed in a time series manner by the management server 400.

The user who possesses the information terminal 500 can read the images accumulated in the management server 400 through the communication network 150. In this case, the control device 530 of the information terminal 500 receives the plurality of images from the management server 400 through the communication network 150, for example, causes a storage unit (not illustrated) to store (or temporarily stores) the plurality of images, and causes the display unit 520 to display the plurality of images in a list display manner or in a sequential manner.

A timing at which the image is transmitted from each of the excavators 100 to the management server 400 is not particularly limited, and for example, the timing may be after a series of the works is completed.

In addition, the work-related information may be embedded in the image by each of the excavators 100 in which the image is captured, or by the management server 400. When the work-related information is embedded by the management server 400, the work-related information may be transmitted from the excavator 100 to the management server 400. Alternatively, a configuration (information acquisition unit 303 in the excavator 100) which can acquire the work-related information may be provided in the management server 400.

Others

Hitherto, the embodiment according to the embodiment of the present invention has been described. However, the present invention is not limited to the above-described embodiment and the modification example.

For example, in the above-described embodiment, the imaging condition is set before the work is carried out. However, the condition may be set by temporarily suspending the work while the work is carried out. In addition, a plurality of the imaging conditions may be set. For example, different work objects may be imaged, or the same work object may be imaged at a plurality of different angles (directions). When the same work object is imaged at the plurality of different angles, a 3D image may be generated by using the acquired images.

In addition, in the modification example of the above-described embodiment, the images are accumulated in the management server 400. However, without using the management server 400, the plurality of excavators 100 may share the imaging conditions and the images by transmitting and receiving the imaging conditions and the images to and from each other. Alternatively, the plurality of excavators 100 may share only the imaging conditions, and the acquired images may be held by each of the plurality of excavators 100.

In addition, without being limited to those which capture the image by the imaging unit, the embodiment of the present invention may be applicable to those which read out a recorded image or extract specific information from the image.

For example, when the device moves to the imaging position where the image is acquired in the past (or the device adopts a position/posture corresponding to the past image, as when at least the direction is coincident with that of the image), the present invention may be applicable to those which can confirm the past image. The past image may be confirmed by using a monitor of the work machine, or may be confirmed by using the management server or the information terminal.

Alternatively, the present invention may be applicable to those which can search for an image, a place, or a time by detecting a specific subject or event from the collected image (or generated moving image). For example, the specific subject is earth filling of earth filling works or a hole formed during the excavation. For example, in addition to an operation of the work machine itself such as "excavation", "turning", and "earth removing", the event includes information on the work machine or the work site such as truck approaching. In order to enable the search, the acquired image may be stored in association with other information (for example, an owner name of the work machine, a rental owner, a name of a construction jobsite, a name of a contractor, and date and time of image capturing). In this manner, the image showing the specific subject or the event can be specified and sorted by using an image analyzer, and can be used for various analysis information.

In addition, the work machine according to the embodiment of the present invention may be work machines other than the excavator, for example, such as a wheel loader, an asphalt finisher, a forklift, and a crane.

In addition, the information management system according to the embodiment of the present invention may include other work machines different therefrom.

In addition, details in the above-described embodiment can be appropriately changed within the scope not departing from the concept of the invention.

As described above, the work machine image acquisition device, the information management system, the information terminal, and the work machine image acquisition program according to the embodiment of the present invention usefully improve the efficiency of the work site by using the imaging device provided in the work machine.

It should be understood that the invention is not limited to the above-described embodiment, but may be modified into various forms on the basis of the spirit of the invention. Additionally, the modifications are included in the scope of the invention.

What is claimed is:

1. A work machine comprising:
    a traveling body;
    a rotating platform mounted on the traveling body;
    an attachment mounted on the rotating platform, and including a work element;
    an imaging unit mounted on the rotating platform, and configured to capture an image of a periphery of the work machine; and
    a processor configured to, while the work machine is being operated, determine whether an imaging range of the imaging unit includes a predetermined subject region designated in advance and cause the imaging unit to capture the image responsive to determining that the imaging range of the imaging unit includes the predetermined subject region,
    wherein the determining whether the imaging range of the imaging unit includes the predetermined subject region and the capturing of the image by the processor are repeatedly performed while the work machine is being operated, and
    wherein the processor is further configured to
        detect an operation of the work machine other than moving of the traveling body, rotation of the rotating platform, and activation of the attachment, and
        cause the imaging unit to capture the image including the predetermined subject region again on a condition that a predetermined operation of the work machine including an excavation operation is detected after the imaging unit previously captured an image including the predetermined subject region.

2. The work machine according to claim 1, wherein the processor is further configured to determine that the imaging range of the imaging unit includes the predetermined subject region, and cause the imaging unit to capture the image, when at least one of information relating to a position of the imaging unit and information relating to a direction of the imaging unit coincides with a predetermined position or a predetermined direction designated in advance.

3. The work machine according to claim 1, wherein the processor is further configured to cause the imaging unit to image the predetermined subject region again after a predetermined amount of time elapses from when the imaging unit previously captured an image of the predetermined subject region.

4. The work machine according to claim 1, wherein the processor is further configured to:
  acquire work-related information relating to work carried out by the work machine; and
  embed the work-related information in the image captured by the imaging unit.

5. The work machine according to claim 1, wherein the processor is further configured to:
  align a plurality of images captured by the imaging unit in a time series manner, the plurality of the images including the image.

6. An information management system comprising:
a plurality of the work machines, each according to claim 1,
  wherein the plurality of work machines respectively include communication devices configured to transmit and receive information to and from each other, and share an imaging condition for capturing the image and the captured image by causing the communication devices to transmit and receive the imaging condition and the captured image to and from each other.

7. An information management system comprising:
the work machine according to claim 1; and
  a processor configured to:
    receive a plurality of images captured by the work machine, and
    align the plurality of images in a time series manner.

8. An information terminal configured to transmit and receive information to and from the work machine according to claim 1,
  wherein the information terminal causes a display unit to display a plurality of images captured by the work machine in a list display manner or in a sequential manner.

9. A non-transitory computer readable medium storing a program that causes a computer of an information terminal configured to transmit and receive information to and from the work machine according to claim 1 to function as a display controller that causes a display unit to display a plurality of images captured by the work machine in a list display manner or in a sequential manner.

10. The work machine according to claim 1, wherein the processor is further configured to determine that the work of the work machine is completed at least in a state where an actuator of the attachment is not moved even when the actuator is operated.

11. The work machine according to claim 2, wherein the direction of the imaging unit is determined while the rotating platform turns.

12. The work machine according to claim 1, wherein the processor is configured to cause the imaging unit to capture the image responsive to determining that the imaging range of the imaging unit includes the predetermined subject region designated in advance and while at least one of the traveling body, the rotating platform, or the attachment is stopped.

* * * * *